United States Patent [19]

Thatcher

[11] Patent Number: 4,876,930
[45] Date of Patent: Oct. 31, 1989

[54] SPIN TRIMMING MACHINE WITH OBJECT POSITIONING

[76] Inventor: Alan J. Thatcher, 9182 E. Russel St., La Habra, Calif. 90631

[21] Appl. No.: 205,832

[22] Filed: Jun. 13, 1988

[51] Int. Cl.$^4$ .......................... B26D 3/16; B23B 3/04; B23B 5/14
[52] U.S. Cl. .......................................... 82/46; 82/100; 82/101; 82/102; 83/914; 264/161; 425/806
[58] Field of Search .................. 82/46, 100, 101, 102; 83/171, 914; 264/161, 536; 425/806

[56] References Cited

U.S. PATENT DOCUMENTS

| | | | |
|---|---|---|---|
| 3,352,404 | 11/1967 | Settembrini | 198/456 |
| 3,429,211 | 2/1969 | Pelot | 82/46 |
| 3,675,521 | 7/1972 | Ziegler | 82/101 |
| 3,800,638 | 4/1974 | Duikers et al. | 82/51 |
| 3,962,938 | 6/1976 | Reilly et al. | 82/47 |
| 3,967,516 | 7/1976 | Griesing et al. | 82/47 |
| 4,305,904 | 12/1981 | Black | 264/536 |
| 4,445,406 | 5/1984 | Thatcher | 82/46 |

Primary Examiner—Frederick R. Schmidt
Assistant Examiner—William E. Terrell
Attorney, Agent, or Firm—Edgar W. Averill, Jr.

[57] ABSTRACT

A spin trimming machine for trimming the necks of objects that have a dome molded above the trim line of the object. The machine is capable of positioning the object being trimmed in a predetermined orientation with respect to its starting orientation. This is carried out by the adjustment of the position and angle of the knife, which adjustment can be carried out while the trimming machine is operating. Preferably, the trimmed objects drop onto a conveyor belt which is porous and a vacuum manifold draws air through the conveyor belt at the point where the object is separated from the dome which holds it.

12 Claims, 3 Drawing Sheets

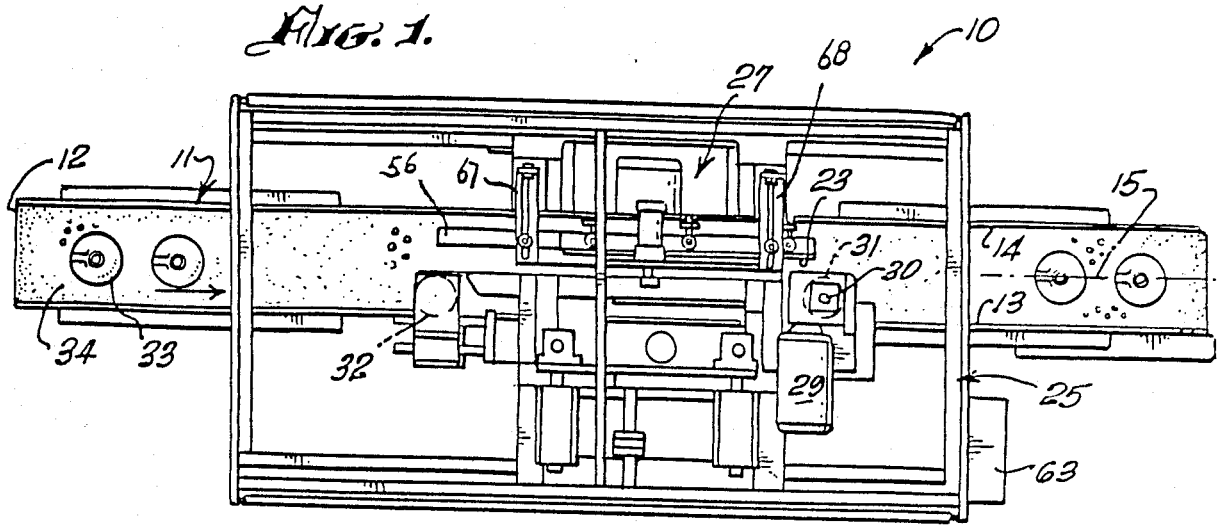
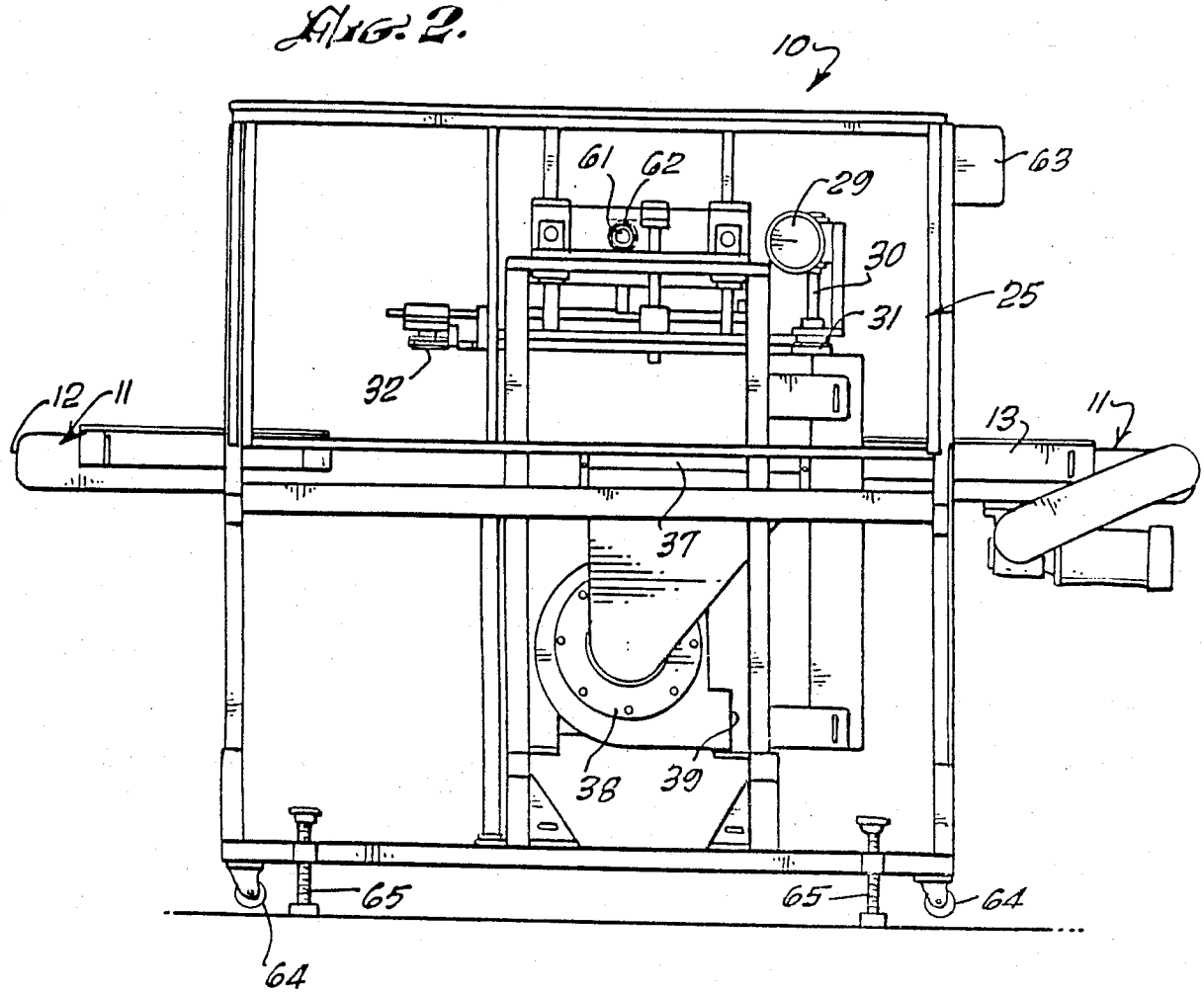

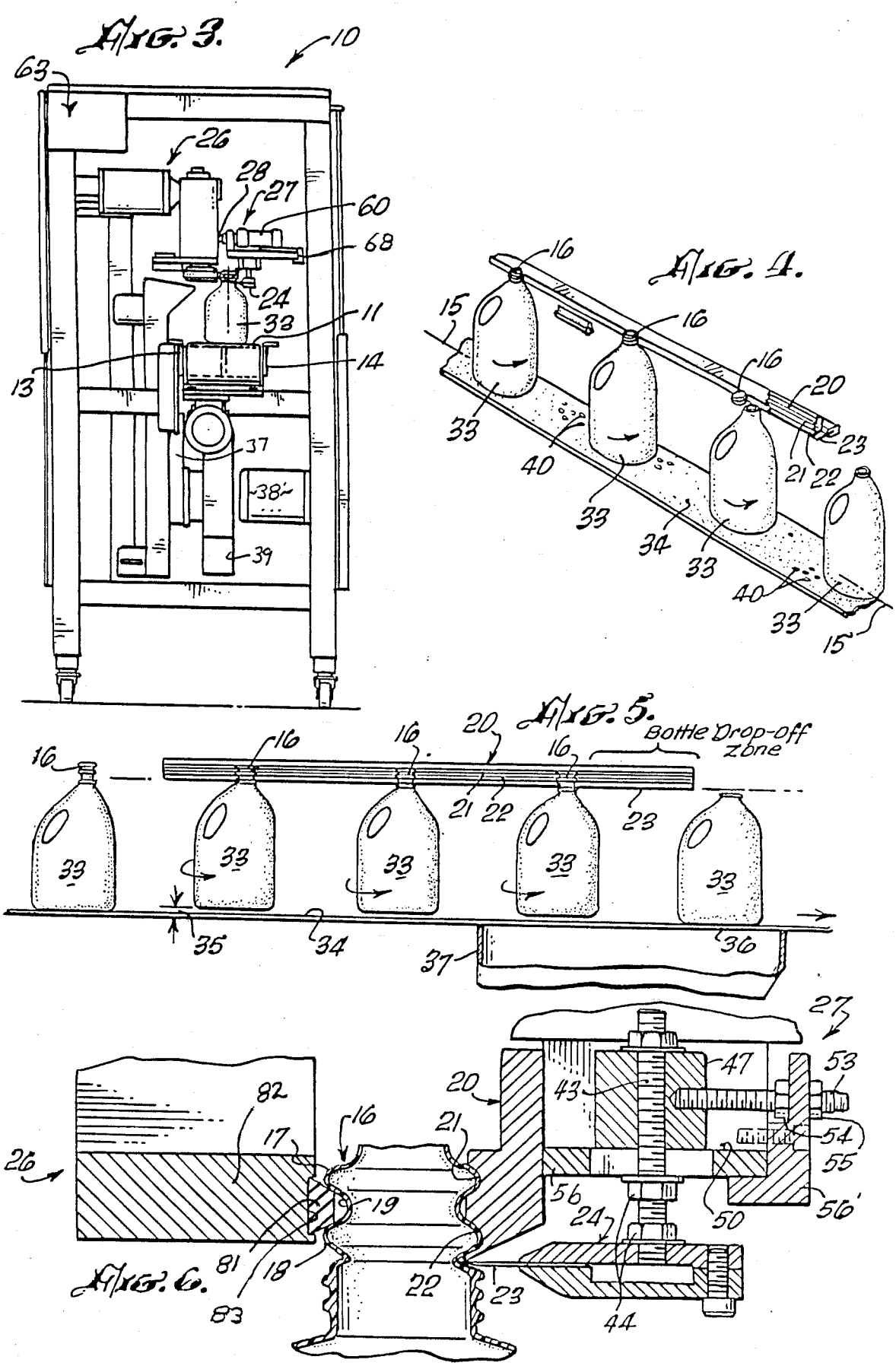

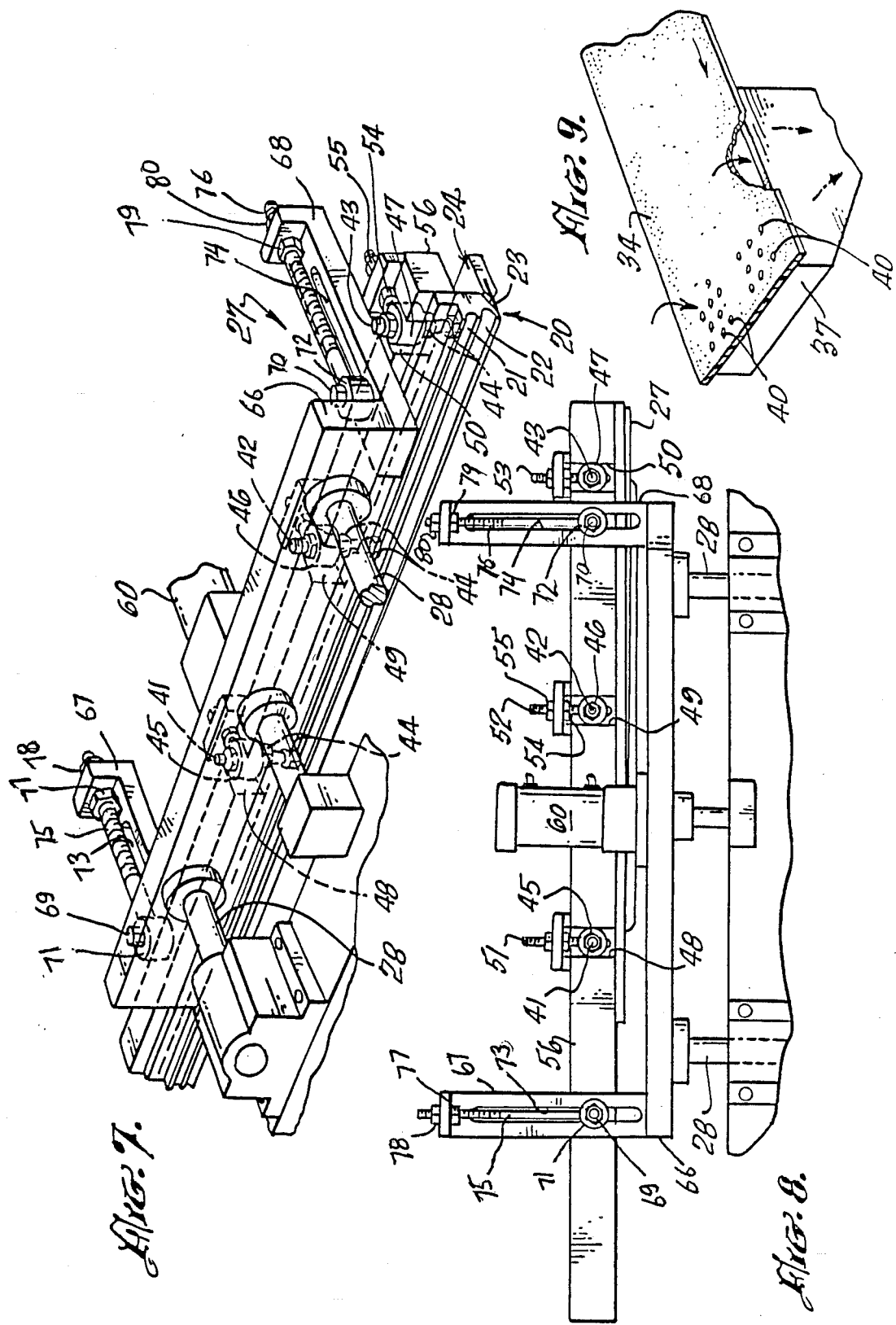

SPIN TRIMMING MACHINE WITH OBJECT POSITIONING

BACKGROUND OF THE INVENTION

The field of the invention is blow molding machinery and the invention relates more particularly to spin trimmers of the type which support a bottle from a dome molded above the trim line and which cause the dome to roll along a dome support bar which has a cutting knife under it.

Applicant's U.S. Pat. No. 4,445,406 shows a spin trimmer of the type discussed herein. In order to reduce labor to the largest extent practical, it is useful to orient a trimmed bottle after it has been separated from the dome. Because of the spinning nature inherent with spin trimming, such orientation was not believed practical. Thus, hand labor was required to orient the bottles, or other trimmed objects, or an additional machine was required to orient the bottles. Such orientation is necessary so that additional processing steps, such as leak testing, flaming, labelling and the like, can be carried out in an automatic fashion.

SUMMARY OF THE INVENTION

It is an object of the present invention to provide a spin trimmer which separates a container from its dome after turning a predetermined number of degrees.

It is a further object of the present invention to provide a spin trimmer which supports the trimmed object after it has been trimmed.

The present invention is for a spin trimming machine for trimming the necks of objects that have a dome molded above the trim line and which machine is capable of positioning the object being trimmed in a predetermined orientation with respect to its starting orientation. The machine has a conveyor belt which feeds the domes of objects to be trimmed against a dome backup bar on one side and dome-spinning belt assembly on the other side. As the object is rolled against the dome backup bar, a knife positioned under the dome backup bar progressively cuts into the trim line below the dome and because of the accurate positioning of the knife, the object will drop the short distance back onto the conveyor belt. Since the knife is adjustable during the running of the machine, the number of turns can be easily adjusted to provide the predetermined number of turns. Preferably, means are provided to steady the object after it has been parted from the dome, and a preferred method for accomplishing this comprises the use of a porous conveyor belt under which a vacuum manifold is positioned. Thus, as the object falls a fraction of an inch from the dome, the bottom of the object is held by a vacuum against the upper surface of the conveyor belt. After a short distance, the conveyor belt passes past the end of the manifold, and the object is sufficiently steadied so that it may move along the conveyor without the need for further steadying. Safety means may be provided to separate the knife from the dome-spinning belt assembly in the event of an object jam-up.

BRIEF DESCRIPTION OF THE DRAWINGS

FIG. 1 is a plan view of the spin trimmer of the present invention.

FIG. 2 is a front view thereof.

FIG. 3 is an end view thereof.

FIG. 4 is a perspective, schematic view showing a bottle in four positions moving along the trimming knife of the spin trimmer of FIG. 1.

FIG. 5 is a simplified side elevation showing the grasping of the trimmed bottle by the vacuum manifold and porous belt of the spin trimmer of FIG. 1.

FIG. 6 is an enlarged end view of the dome support and knife portion of the spin trimmer of FIG. 1.

FIG. 7 is a perspective view of the blade adjustment means of the spin trimmer of FIG. 1.

FIG. 8 is a top view of the blade adjustment mechanism of the spin trimmer of FIG. 1.

FIG. 9 is a perspective view, partially cut away of the vacuum manifold and porous conveyor belt of the spin trimmer of FIG. 1.

DESCRIPTION OF THE PREFERRED EMBODIMENTS

The spin trimmer of the present invention is shown in plan view in FIG. 1 and indicated generally by reference character 10. Objects, such as plastic bottles, are fed into spin trimmer 10 on a conveyor 11 which has a feed end 12. Conveyor 11 has a first side 13 and a second side 14 and a central axis 15. The plastic bottles, or other objects, have a dome molded at the top thereof as indicated best in FIG. 6 where the dome is indicated by reference character 16. Dome 16 has two ridges 17 and 18 with a groove 19 therebetween. The dome is rolled along a dome backup bar 20 by a belt 81 held against a backup bar 82 which has a belt supporting face 83. Dome 16 has a pair of grooves 21 and 22. An elongated knife blade 23 is positioned just below dome backup bar 20 and is held in a knife support clamp 24 which, preferably, is heated in a manner similar to that shown in applicant's U.S. Pat. No. 4,445,406.

Returning to FIG. 1, the frame of the device is shown and indicated by reference character 25. Frame 25 supports not only conveyor 11, but also the trimming portion by supporting the dome-spinning belt assembly which is indicated generally by reference character 26 in FIG. 3. Belt assembly 26, in turn, supports the dome backup bar and knife assembly indicated generally by reference character 27 in FIG. 3. This support is carried out by a pair of cylindrical rods, one of which is indicated in FIGS. 3, 7 and 8 by reference character 28, which hold support bar 66. The motor 29 for driving the drive belt 81 is shown in FIGS. 1, 2 and 3, and in FIG. 2, the drive shaft 30 and pulley 31 are also shown. A second pulley 32 has means for tensioning the belt, which means are conventional and not shown in detail in the drawings. FIG. 1 is diagrammatic in the sense that many details are omitted in order to illustrate the major features of the spin trimmer.

An important feature of the present invention is the method used to steady the trimmed object after it has parted from the dome. The dropping details are shown best in FIG. 5 where it can be seen that bottle 33 is lifted slightly above conveyor belt 34 so that the bottle may roll along dome backup bar 20 without any friction from contact with conveyor belt 34. The gap below bottle 33 and above conveyor belt 34 is indicated by reference character 35. The cutting edge of elongated knife blade 23 is set at an angle with respect to dome backup bar 20 so that it cuts further into the object as the object rolls along the dome backup bar. Depending upon the position of the blade 23, after a certain number of turns, the dome 16 is separated from bottle 33 and the bottle drops onto the conveyor belt as indicated at reference character 36. As shown both in FIG. 5 and in FIG. 2, a vacuum manifold 37 is affixed to the intake of a blower indicated generally by reference character 38 in FIG. 2. Blower 38 has a motor 38,, and an outlet 39, and the inlet is drawn through conveyor belt 34. As shown in FIG. 9, conveyor belt 34 has a plurality of holes 40 along the entire length of the belt and the air is drawn into the manifold through the holes. As the bottle 33 falls onto the conveyor belt, as indicated in FIG. 5 at reference character 36, the slight vacuum on the underside of holes 40 securely grasps the bottom of the bottle and prevents it from any further turning. The conveyor belt, of course, is moving along the upper surface of the conveyor and after a short distance, bottle 33 is merely conveyed along the upper surface of belt 34 without the need for any additional grasping by a vacuum.

The method used for adjusting the elongated knife blade 23 forms an important part of the present invention. This is shown best in FIG. 7 of the drawings where it can be seen that knife support clamp 24 is held by three threaded studs 41, 42 and 43 which are held to clamp 24 by a set of nuts indicated by reference character 44 (shown best in FIG. 6). Studs 41, 42 and 43 are, in turn, held in three brass cylinders 45, 46 and 47 which rest within three slots 48, 49 and 50 in bar 56. Cylinders 45, 46 and 47, in turn, have a horizontal stud and these studs are indicated by reference characters 51, 52 and 53. The position of these studs determines the position of the knife and this is adjusted by nuts 54 and 55 which are on either side of bar 56 which is positioned at the end of bar 56. By loosening and tightening nuts 54 and 55, the angle of knife blade 23 may be adjusted as the spin trimmer is operating. By moving brass cylinder 47 toward the central axis 15 of the conveyor, it can be seen that the dome will be parted from the object at an earlier point. Bar 56 is also adjustable with respect to bar 66 from which it is supported which permits the accurate alignment of the dome backup bar with respect to the belt. A pair of slotted support arms 67 and 68 are affixed to the bottom of bar 66. Support bar 56 is held by bolts 69 and 70 which, in turn, are held in brass collars 71 and 72. Collars 71 and 72 are held on the upper surface of slotted support arms 67 and 68 and studs 69 and 70 can move along slots 73 and 74. Threaded rods 75 and 76 pass through openings in the upturned portions of support arms 67 and 68. These openings are large enough so that the rods 75 and 76 can freely move through the openings. Nuts 77, 78, 79 and 80 are then used to position collars 71 and 72 and, thus, bar 56 in the desired location. The earlier the dome is separated from the object, the fewer degrees of revolution will take place. It has been found that a very accurate cutting and positioning operation can be carried out with three revolutions of the bottle. Thus, if the handle is positioned first as the bottle enters the spin trimmer, when properly adjusted, the bottle will make exactly three revolutions and the handle will end up in the same position as it was when it entered the machine. Of course, it would also be possible to adjust the machine to turn the bottle two and one-half times to change the orientation of the handle or, for that matter, to provide any desired number of whole and partial turns.

A safety feature is provided by an air cylinder 60 shown best in FIG. 3 of the drawings. In the event of a jam-up of the machine, air cylinder 60 is pressurized, and the dome backup bar and knife assembly 27 is moved outwardly with respect to the dome-spinning belt assembly 26 thereby freeing any object that may be caught between the two assemblies. This can easily be operated by a pushbutton on the exterior of the machine, thus providing an additional level of safety.

While the knife support clamp is shown as being held by three vertical support members, it could, of course, be held by a different number of vertical supports. It is important, however, that the adjustment means be operable while the machine is running so that the point at which the bottles are separated from the dome can be properly adjusted for the desired orientation. Means are provided for accurately adjusting the position of the dome-spinning belt assembly from the central axis 15 of the conveyor belt. This is accomplished by a large threaded shaft 61 which has a large nut 62 which may be manipulated by the operator, depending upon the size of the dome of the object to be trimmed. An electrical control panel is indicated generally by reference character 63. The frame 25 is preferably supported on casters which have wheels to facilitate rolling the trimmer to a desired position downstream of the blow molding machine. Four threaded legs 65 permit the height adjustment to accurately position the top of the conveyor belt to coincide with the conveyor belt of an adjacent handling machine.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A spin trimming machine for trimming the necks of objects that have a dome molded above the trim line of the object, which machine is capable of positioning the object being trimmed in a predetermined orientation with respect to its starting orientation, said spin trimming machine comprising:

a frame;

a conveyor belt held by said frame for conveying objects to be trimmed along the machine, said conveyor belt having a central axis and a first side and a second side;

a dome-spinning belt assembly including a drive belt, a belt backup bar, and means for driving said belt along the face of the backup bar, said belt assembly being supported by said frame with the face of the belt backup bar being parallel to said conveyor belt;

a dome backup bar having a top and a bottom and having at least one elongated groove therealong, said dome backup bar being supported by said frame so that the groove is parallel to said conveyor belt and at the same height as the face of the backup bar;

an elongated knife, and knife support clamp means for holding said knife on said frame adjacent the bottom of said dome backup bar so that the position of said elongated knife is adjustable inwardly or outwardly with respect to the dome backup bar by means during the running of said machine whereby the length that the bottle will travel along the knife before the dome is cut off from the bottle may be adjusted so that the object always drops from the dome at a predetermined number of degrees.

2. The spin trimmer of claim 1 wherein the conveyor belt has means for grasping the object after it has been trimmed.

3. The spin trimmer of claim 2 wherein said means for grasping the object after it has been trimmed comprises a conveyor belt which permits the passage of air therethrough and a vacuum manifold positioned under the conveyor belt at a position directly below the object at the position where it falls from the dome.

4. A spin trimming machine for trimming the necks of objects that have a dome molded above the trim line of the object, which machine is capable of positioning the object being trimmed in a predetermined orientation with respect to its starting orientation, said spin trimming machine comprising:

a frame;

a conveyor belt held by said frame for conveying objects to be trimmed along the machine, said conveyor belt having a central axis and a first side and a second side and said conveyor belt being porous, permitting the passage of air therethrough;

a dome-spinning belt assembly including a drive belt, a belt backup bar, and means for driving said belt along the face of the backup bar, said belt assembly being supported by said frame with the face of the belt backup bar being parallel to said conveyor belt;

a dome backup bar having a top and a bottom and having at least one elongated groove therealong, said dome backup bar being supported by said frame so that the groove is parallel to said conveyor belt and at the same height as the face of the backup bar;

an elongated knife, and means including a knife support clamp for holding said knife on said frame adjacent the bottom of said dome backup bar so that, said elongated knife is angularly and laterally adjustable inwardly or outwardly with respect to the dome backup bar by the change of position of the knife support clamp during the running of said machine whereby the length that the bottle will travel along the knife before the dome is cut off from the bottom may be adjusted so that the object always drops from the dome at a predetermined number of degrees; and a vacuum manifold positioned under said conveyor belt at an area where objects drop from the dome as it is fully cut from the object.

5. The spin trimmer of claim 4 wherein said knife support clamp is held by at least two adjustable vertical members.

6. The spin trimmer of claim 5 wherein said adjustable vertical members are each held by a block, which block is held on a slotted platform, the slots of which are perpendicular to the longitudinal axis of said conveyor belt.

7. The spin trimmer of claim 6 wherein each of said blocks have a threaded stud extending away from said knife and accessible from the exterior of the spin trimming machine so that the position of the block, and therefore the knife, is adjustable by the position of the threaded stud.

8. The spin trimmer of claim 6 wherein there are three of said blocks.

9. The spin trimmer of claim 4 wherein said knife is supported by a support bar, which support bar also supports said dome backup bar.

10. The spin trimmer of claim 4 wherein the distance of the backup bar from a vertical plane, which bisects the longitudinal axis of the conveyor belt, is adjustable.

11. A spin trimming machine for trimming the necks of objects that have a dome molded above the trim line of the object, which machine is capable of positioning the object being trimmed in a predetermined orientation with respect to its starting orientation, said spin trimming machine comprising:

a frame;

a conveyor belt held by said frame for conveying objects to be trimmed along the machine, said conveyor belt having a first side and a second side;

a dome-spinning belt assembly including a drive belt, a belt backup bar, and means for driving said belt along the face of the backup bar, said belt assembly being supported by a support bar supported by said frame with the face of the belt backup bar being parallel to said conveyor belt and on the first side thereof;

a dome backup bar having at least one elongated groove therealong, said dome backup bar being supported by a backup bar support member which, in turn, is supported by a guide rail supported by the frame, said guide rail permitting the movement of the dome backup bar away from the face of the belt backup bar of the dome-spinning belt assembly so that the groove is parallel to said conveyor belt and at the same height as the face of the backup bar;

an elongated knife held by said backup bar support member, said knife being adjacent the bottom of said dome backup bar, said elongated knife being adjustable during the running of said machine whereby the length that the bottle will travel along the knife before the dome is cut off from the bottle may be adjusted so that the object always drops from the dome at a predetermined number of degrees and said elongated knife moves away from the dome-spinning belt assembly with the dome backup bar; and means for moving the dome backup bar and the knife assembly away from the dome-spinning belt assembly to facilitate the removal of an object being trimmed in the event of need wherein said means for moving the dome backup bar comprises an air cylinder and piston.

12. The spin trimmer of claim 11 wherein the air cylinder and piston are supported by said backup bar support member.

* * * * *